US009285661B2

(12) United States Patent
Tsukioka

(10) Patent No.: US 9,285,661 B2
(45) Date of Patent: Mar. 15, 2016

(54) PROJECTOR

(71) Applicant: Seiko Epson Corporation, Tokyo (JP)

(72) Inventor: Keita Tsukioka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 226 days.

(21) Appl. No.: 14/055,178

(22) Filed: Oct. 16, 2013

(65) Prior Publication Data

US 2014/0111778 A1  Apr. 24, 2014

(30) Foreign Application Priority Data

Oct. 19, 2012  (JP) ................................. 2012-231899

(51) Int. Cl.
  *G03B 21/14*  (2006.01)
  *G02B 7/02*  (2006.01)
  *G03B 21/00*  (2006.01)
  *H04N 9/31*  (2006.01)

(52) U.S. Cl.
  CPC .............. *G03B 21/145* (2013.01); *G02B 7/023* (2013.01); *G03B 21/006* (2013.01); *G03B 21/142* (2013.01); *H04N 9/3141* (2013.01)

(58) Field of Classification Search
  CPC ........ G03B 21/142; G02B 7/02; G02B 7/023; G02B 7/04

USPC .................. 353/101, 100; 359/694, 703, 813
See application file for complete search history.

(56) References Cited

U.S. PATENT DOCUMENTS

| 7,014,324 | B2* | 3/2006 | Jang .............................. 353/101 |
| 7,922,343 | B2* | 4/2011 | Lee et al. ....................... 353/101 |
| 7,950,810 | B2* | 5/2011 | Liao et al. ...................... 353/101 |
| 8,632,191 | B2* | 1/2014 | Wakabayashi ................. 353/101 |
| 8,752,968 | B2* | 6/2014 | Saito et al. ..................... 353/100 |
| 2012/0120373 | A1* | 5/2012 | Koyama .......................... 353/81 |
| 2014/0092370 | A1* | 4/2014 | Nemura ......................... 353/101 |
| 2014/0092371 | A1* | 4/2014 | Nemura et al. ................ 353/101 |
| 2014/0118706 | A1* | 5/2014 | Fujioka et al. ................ 353/101 |

FOREIGN PATENT DOCUMENTS

JP  2005-140895 A  6/2005

* cited by examiner

*Primary Examiner* — William C Dowling
(74) *Attorney, Agent, or Firm* — ALG Intellectual Property, LLC

(57) ABSTRACT

A projector includes a light source section that outputs light, a light modulator that modulates the light outputted from the light source section based on image information, a projection lens that projects the modulated light, an enclosure that accommodates the light source section, the light modulator, and the projection lens, a base that supports the projection lens and fixes the projection lens to the enclosure, and a restricting portion that restricts movement of the base.

7 Claims, 7 Drawing Sheets

PROJECTOR

CROSS REFERENCE TO RELATED APPLICATIONS

This application claims priority to Japanese Patent Application No. 2012-231899 filed on Oct. 19, 2012, the entire contents of which are incorporated by reference herein.

BACKGROUND

1. Technical Field

The present invention relates to a projector.

2. Related Art

There is a known projector of related art including an optical unit that can output modulated light according to image information and a projection lens that projects the modulated light. The projector has a configuration in which an enclosure accommodates the optical unit and the projection lens. The projection lens is attached to the enclosure via screws or any other fixing member.

If the projector accidentally falls or hits an object, however, an impact acting on the enclosure is transmitted to a portion that fixes the projection lens to the enclosure and there is a possibility of breakage of the fixing portion. In recent years, the weight of the projection lens tends to increase, and the possibility of breakage of the fixing portion increases accordingly. In view of the situation described above, a configuration that excels in impact resistance is required. JP-A-2005-140895 is exemplified as a related art document.

SUMMARY

An advantage of some aspects of the invention is to provide a projector that excels in impact resistance.

A projector according to an aspect of the invention includes a light source section that outputs light, a light modulator that modulates the light outputted from the light source section based on image information, a projection lens that projects the modulated light, an enclosure that accommodates the light source section, the light modulator, and the projection lens, a base that supports the projection lens and fixes the projection lens to the enclosure, and a restricting portion that restricts movement of the base.

According to the aspect of the invention, since a restricting portion that restricts movement of the base is provided, movement of the base is restricted even when an impact or any other force acts on the projection lens. In this case, the amount of stress induced in a portion via which the base is attached to the enclosure can be reduced, whereby the base or the enclosure will not be broken. The thus provided projector excels in impact resistance.

In the projector described above, it is preferable that the restricting portion is disposed in a position where the restricting portion restricts rotation of the projection lens and the base around the center of gravity of the projection lens.

According to this configuration, in which the restricting portion is disposed in a position where it restricts rotation of the projection lens and the base around the center of gravity of the projection lens, the restricting portion is disposed along a direction in which the base is likely to move when an externally applied impact or any other force causes the projection lens to oscillate, whereby movement of the base can be more effectively restricted.

In the projector described above, it is preferable that the restricting portion is disposed in a position where the restricting portion is not in contact with the base.

According to this configuration, since the restricting portion is so positioned that it is not in contact with the base, the base will not be positioned by the restricting portion, whereby precision at which the projection lens is attached will not deteriorate.

In the projector described above, it is preferable that the restricting portion is disposed in the enclosure.

According to this configuration, since the restricting portion is disposed in the enclosure, movement of the base can be restricted without use of screws or any other fixing member, whereby the number of parts can be reduced and efficiency at which the projector is assembled can be improved.

In the projector described above, it is preferable that the base has a plate-like shape and has a first plate surface and a second plate surface facing away from the first plate surface, and the restricting portion is disposed in positions that sandwich the first plate surface and the second plate surface of the base.

According to this configuration, since the base has a plate-like shape and the restricting portion is disposed in positions that sandwich the first plate surface and the second plate surface of the base, movement of the base toward the first plate surface and movement of the base toward the second plate surface can both be restricted, whereby movement of the base can be more effectively restricted.

In the projector described above, it is preferable that the base is elongated in a predetermined direction, the restricting portion is provided in a plurality of positions, and the plurality of restricting portions are disposed along the predetermined direction.

According to this configuration, the base is elongated in a predetermined direction, the restricting portion is provided in a plurality of positions, and the plurality of restricting portions are disposed along the predetermined direction, whereby movement of the base can be restricted at each of the restricting portions disposed in the longitudinal direction of the base. Movement of the base can therefore be more effectively restricted.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
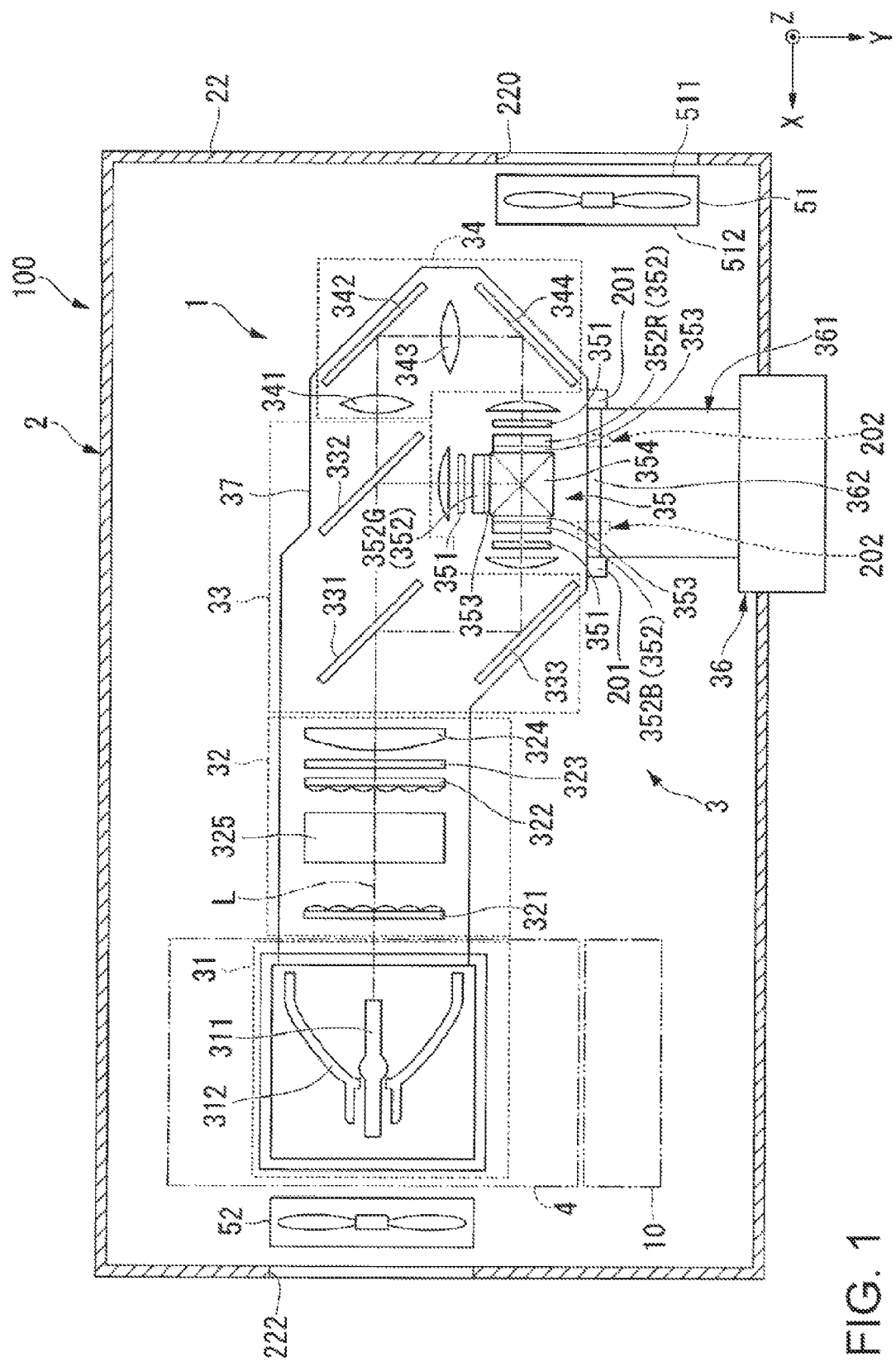
FIG. 1 schematically shows the configuration of a projector.

An embodiment of the invention will be described below with reference to the drawings. In the drawings used in the following description, each member is not drawn to scale as appropriate in order to draw the member with a recognizable size.

First Embodiment

FIG. 1 schematically shows the configuration of a projector 100.

The projector 100 has a configuration in which a main body 1 is accommodated in an exterior enclosure 2, as shown in FIG. 1. The exterior enclosure 2 is made of a synthetic resin and has an upper case (not shown) that forms an upper portion of the exterior enclosure 2 and a lower case 22 that forms a lower portion of the exterior enclosure 2. The upper case and the lower case 22 are fixed to each other, for example, with screws. The exterior enclosure 2 is also simply called an enclosure 2 in the following description.

In the exterior enclosure 2, a controller 10, an optical unit 3, a power source unit 4, a cooling fan 51, an exhaust fan 52, and other components are disposed as the main body 1.

The optical unit 3 includes a light source section 31 having a light source 311, an illumination optical section (illumination system) 32, a color separation optical section 33, a relay optical section 34, an electro-optic section 35, a projection lens section 36, and an optical part enclosure 37, which places the optical parts described above in predetermined positions. The optical unit 3 optically processes a light flux emitted from the light source 311 under the control of the controller 10 in such a way that the electro-optic section 35 forms image light according to image information and the projection lens section 36 displays the image light in the form of an image on a screen or any other surface.

The light source section 31 is disposed in an end portion of the exterior enclosure 2, and the projection lens section 36 is disposed in a substantially central portion of the exterior enclosure 2. In the following description, the orientations are defined for ease of description as follows: A +X direction is a direction in which the light source section 31 outputs a light flux; a +Y direction is a direction in which the electro-optic section 35 outputs image light; and a Z direction is a direction in which the cases 21 and 22, which form the exterior enclosure 2, are combined with each other.

The light source section 31 includes the light source 311 and a reflector 312, and the light source 311 is a discharge-type light source formed, for example, of an ultrahigh-pressure mercury lamp or a metal halide lamp. In the light source section 31, the reflector 312 aligns the directions of light fluxes emitted from the light source 311 with each other and directs the aligned light fluxes toward the illumination optical section 32.

The illumination optical section 32 includes a first lens array 321, a second lens array 322, a polarization conversion element 323, a superimposing lens 324, and a light control mechanism (light blocking mechanism) 325. The first lens array 321 has lenslets arranged in a matrix, and each of the lenslets has a substantially rectangular contour when viewed along an optical axis L of the light fluxes emitted from the light source 311. The thus configured first lens array 321 divides the light flux outputted from the light source section 31 into a plurality of sub-light fluxes. The second lens array 322 has substantially the same configuration as that of the first lens array 321. The second lens array 322 along with the superimposing lens 324 substantially superimposes the sub-light fluxes on each other on the surface of each liquid crystal light valve (light modulator) 352, which will be described later. The polarization conversion element 323 has a function of aligning randomly polarized light fluxes having exited out of the second lens array 322 with each other to form a substantially one type of polarized light that can be used by the liquid crystal light valves 352.

The light control mechanism 325 includes light blocking shutters (light blocking members) 326 and 327 (FIG. 3), which block part of the light fluxes emitted from the light source 311, and has a function of adjusting the amount of light that passes through the light control mechanism 325. The light control mechanism 325, the configuration of which will be described later in detail, operates under the control of the controller 10 described above in such a way that the light blocking shutters 326 and 327 block part of the light fluxes having been emitted from the light source 311 and having passed through the first lens array 321 to adjust the amount of light incident on the second lens array 322 and hence the amount of light incident on the electro-optic section 35 for improvement in contrast of a projected image.

The color separation optical section 33 includes two dichroic mirrors 331 and 332 and a reflection mirror 333 and has a function of separating the light flux having exited out of the illumination optical section 32 into the following three color light fluxes: red light (hereinafter referred to as "R light"); green light (hereinafter referred to as "G light"); and blue light (hereinafter referred to as "B light").

The relay optical section 34 includes a light-incident side lens 341, a relay lens 343, and reflection mirrors 342 and 344 and has a function of guiding the R light having passed through the second dichroic mirror 332 to a liquid crystal light valve 352R for R light. The optical unit 3 is so configured but not necessarily that the relay optical section 34 guides the R light. For example, the optical unit 3 may be so configured that the relay optical section 34 guides the B light.

The electro-optic section 35 includes light-incident-side polarizers 351, the liquid crystal light valves 352 as light modulators, light-exiting-side polarizers 353, and a cross-dichroic prism 354 as a light combining optical section and modulates the color light fluxes having exited out of the color separation optical section 33 in accordance with image information.

The projection lens section 36 includes a lens main body 361, which includes a combination lens formed of a plurality of lenses, and a base 362, which supports the lens main body 361. The projection lens section 36 projects the modulated light fluxes from the electro-optic section 35 through the lens main body 361. The lens main body 361 is fixed to the base 362, for example, with screws, and the projection lens section 36 is fixed to the lower case 22 via the base 362. The lens main body 361 corresponds to the projection lens in the appended claims.

The power source unit 4 rectifies and smoothens AC power supplied from an external power source and outputs the resultant power to the light source 311, the controller and other components. The power source unit 4 is disposed below the light source section 31, specifically, accommodated in a power source case (not shown) attached to the bottom of the lower case 22.

The cooling fan 51 is formed of a sirrocco fan that sucks air along the axis of rotation and discharges the sucked air in the direction tangential to the direction of rotation and disposed inside an intake port 220 in the vicinity of the relay optical section 34. The cooling fan 51 has an intake port 511, through which outside air is sucked and which faces the intake port 220, and a discharge port 512, through which the air is discharged and which faces the relay optical section 34. The cooling fan 51 cools the heat-generating relay optical section 34 by discharging the outside air introduced through the intake port 511 toward the relay optical section 34. The exhaust fan 52 is formed of an axial-flow fan and disposed inside an exhaust port 222 and between the exhaust port 222 and the light source section 31. The exhaust fan 52 receives air having cooled the light source section 31 and other components and hence having been heated and exhausts the heated air out of the exterior enclosure 2 through the exhaust port 222.

The controller 10 includes a circuit substrate 53, on which a CPU (central processing unit), a ROM (read only memory), a RAM (random access memory), and other components are mounted, and a driver substrate 54. The controller 10 functions as a computer and controls the operation of the projector 100. The position of the controller 10 in FIG. 1 is a schematically shown position and different from an actual position. In practice, the controller 10 is so disposed that it covers the optical unit 3.

The controller 10, for example, not only controls light emitting action of the light source section 31 described above but also produces a drive signal according to an image signal inputted through an operation section 23 and outputs the drive signal to the electro-optic section 35. When producing the drive signal, the controller 10 performs image quality adjustment and other processes according to parameters set by a user. The thus configured controller 10, for example, includes a storage portion, an information acquisition portion, an image generation portion, a drive control portion, and an information saving portion.

Figure 2:
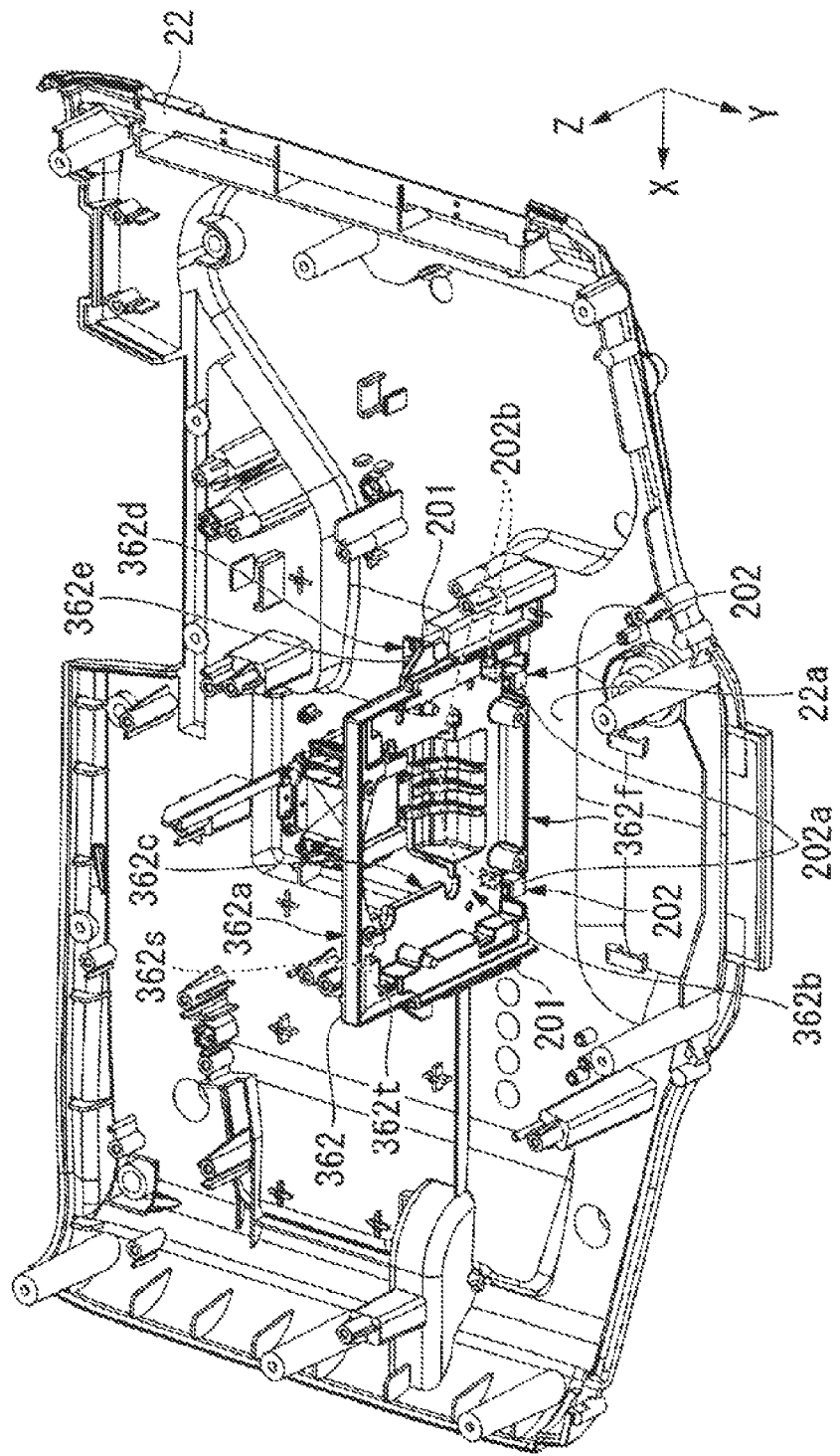
FIG. 2 is a perspective view showing the configuration of a lower case.
Figure 3:
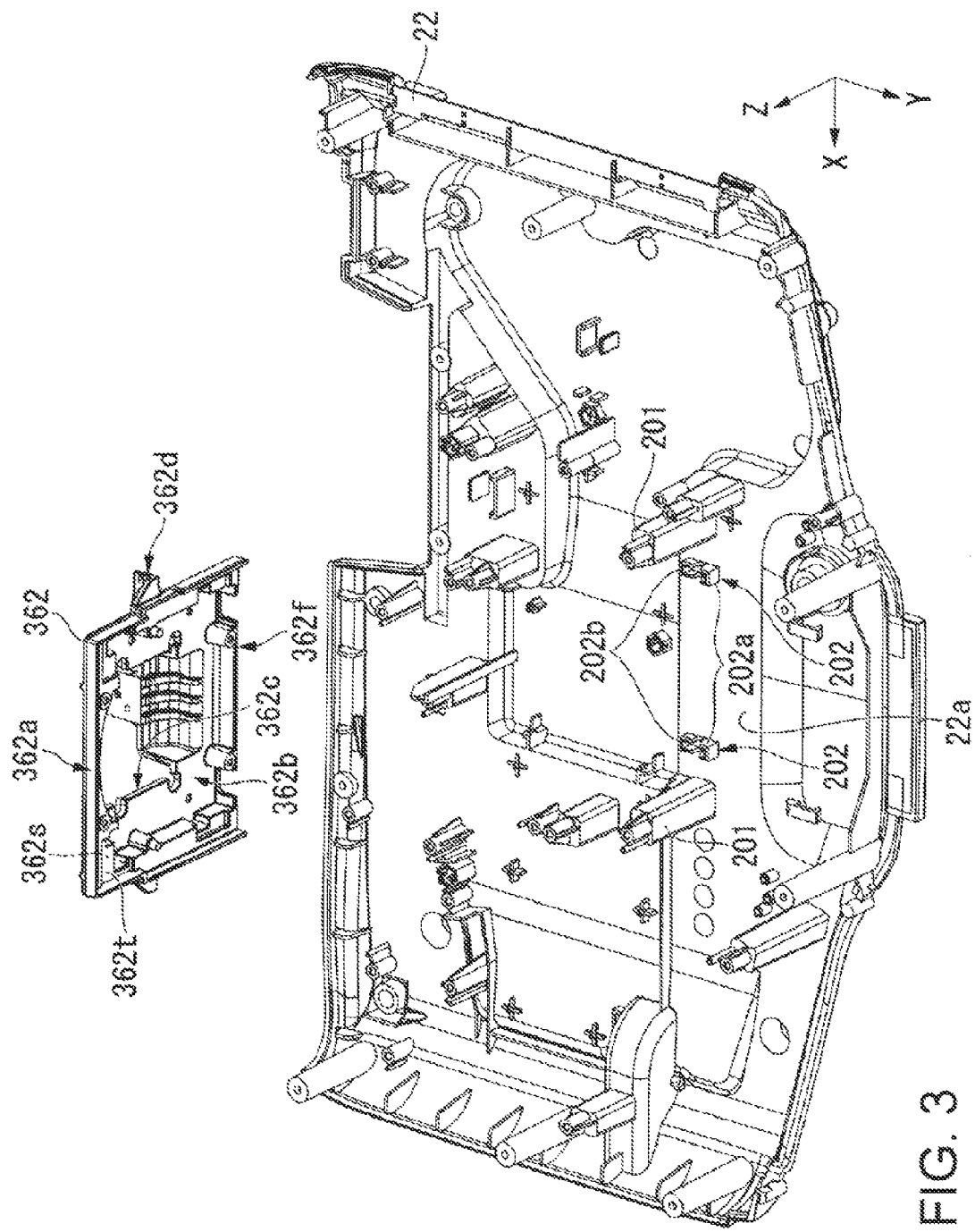
FIG. 3 is another perspective view showing the configuration of the lower case.

FIGS. 2 and 3 are perspective views showing the configuration of the lower case 22. FIG. 2 shows a state in which the base 362 is attached. FIG. 3 shows a state in which the base 362 is removed. In FIGS. 2 and 3, the lens main body 361 in the projection lens section 36 is omitted so that the configuration of the lower case 22 can readily be understood.

The base 362 has a plate-like shape and has a first plate surface 362s facing the −Y side and a second plate surface 362t facing the +Y side, as shown in FIGS. 2 and 3. The base 362 has a frame portion 362a having a rectangular ring shape when viewed in the Y direction, a bottom portion 362b attached to the frame portion 362a, an aperture 362c formed through part of the bottom portion 362b in the Y direction, and fixing portions 362d provided on both X-direction end sides (+X-side end side and −X-side end side) of the frame portion 362a.

The bottom portion 362b supports the lens main body 361. The bottom portion 362b and the lens main body 361 are fixed to each other with screws or any other fixing member (not shown). The lens main body 361 and the base 362 are therefore integrally fixed to each other. Part of the lens main body 361 (end portion on −Y side) is inserted into the aperture 362c in the Y direction.

The fixing portions 362d are fixed to +Z-side end surfaces of columnar portions 201 provided on the lower case 22 with fixing members 362e, such as screws. Each of the fixing portions 362d has a plate-like shape, and the −Z-side end surface thereof is formed as a flat surface parallel to the XY plane. On the other hand, the +Z-side end surface of each of the columnar portions 201 is formed as a flat surface parallel to the XY plane. The fixing portions 362d and the columnar portions 201 are therefore fixed to each other with the flat surfaces thereof in contact with each other. The base 362 is therefore fixed with the attitude thereof with respect to the XY plane restricted.

In the state in which the base 362 is fixed, the −Z-side end side of the frame portion 362a forms a facing portion 362f, which faces the lower case 22 and has a longitudinal direction in the X direction. A protrusion 202a and a protrusion 202b are so provided on a bottom surface 22a of the lower case 22 that the protrusions sandwich the facing portion 362f in the Y direction. The paired protrusion 202a and protrusion 202b are provided at two locations in the X direction. Each of the pairs of protrusion 202a and protrusion 202b forms a restricting portion 202, which restricts movement of the base 362.

Figure 4:
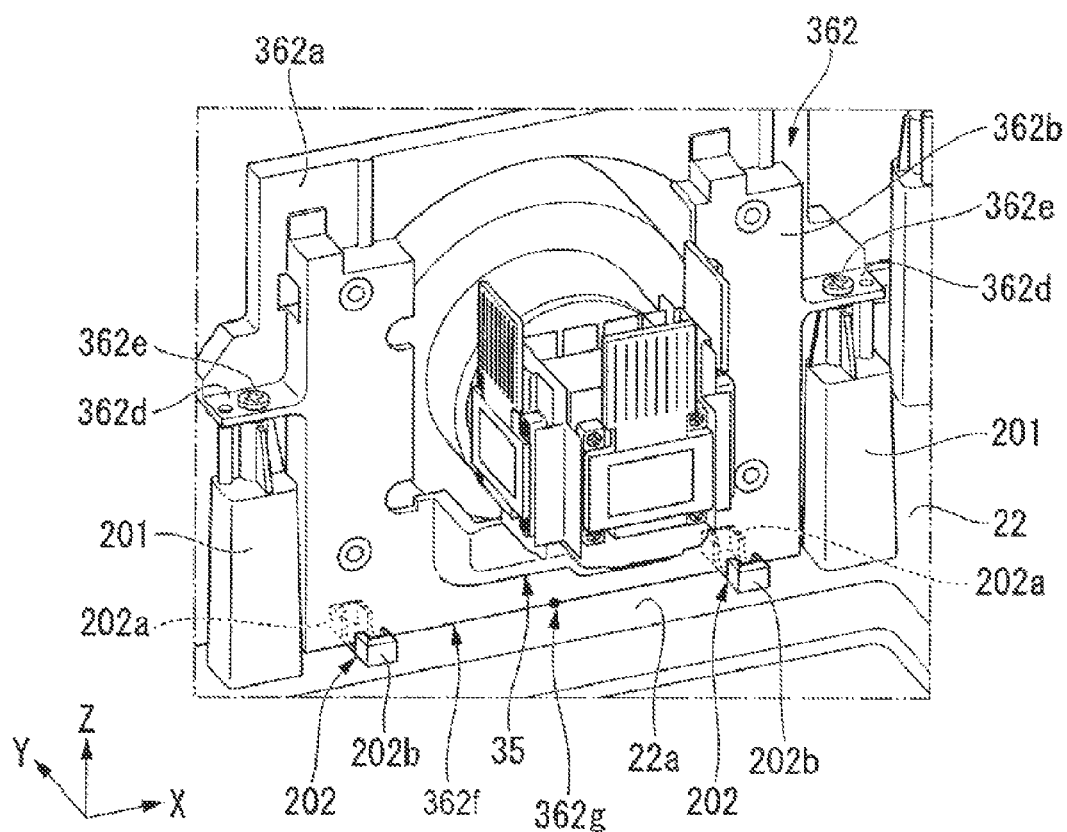
FIG. 4 is a perspective view of a base viewed in the +Y direction.
Figure 5:
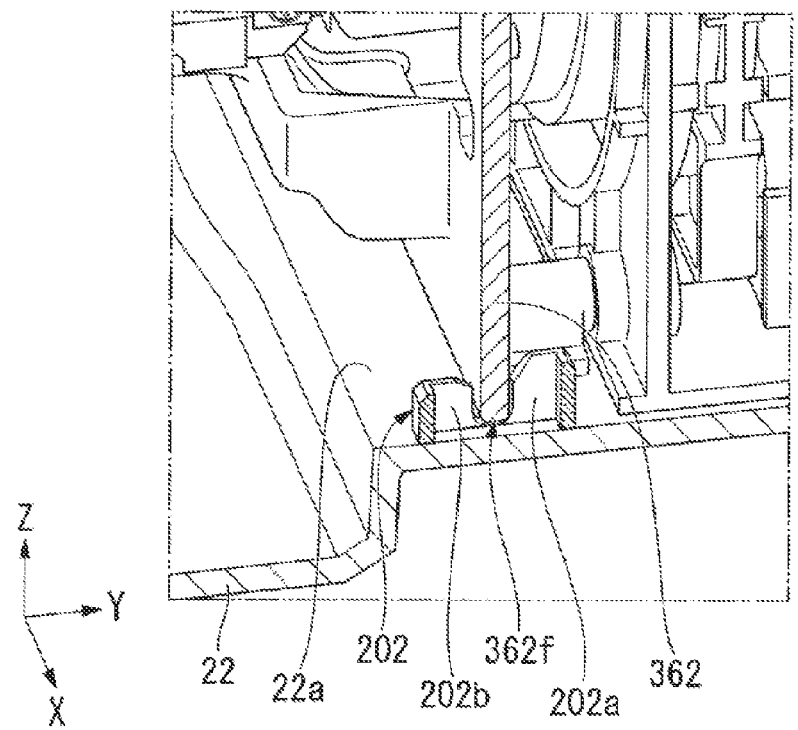
FIG. 5 is a cross-sectional view of a portion including a restricting portion taken along a plane parallel to the YZ plane.
Figure 6:
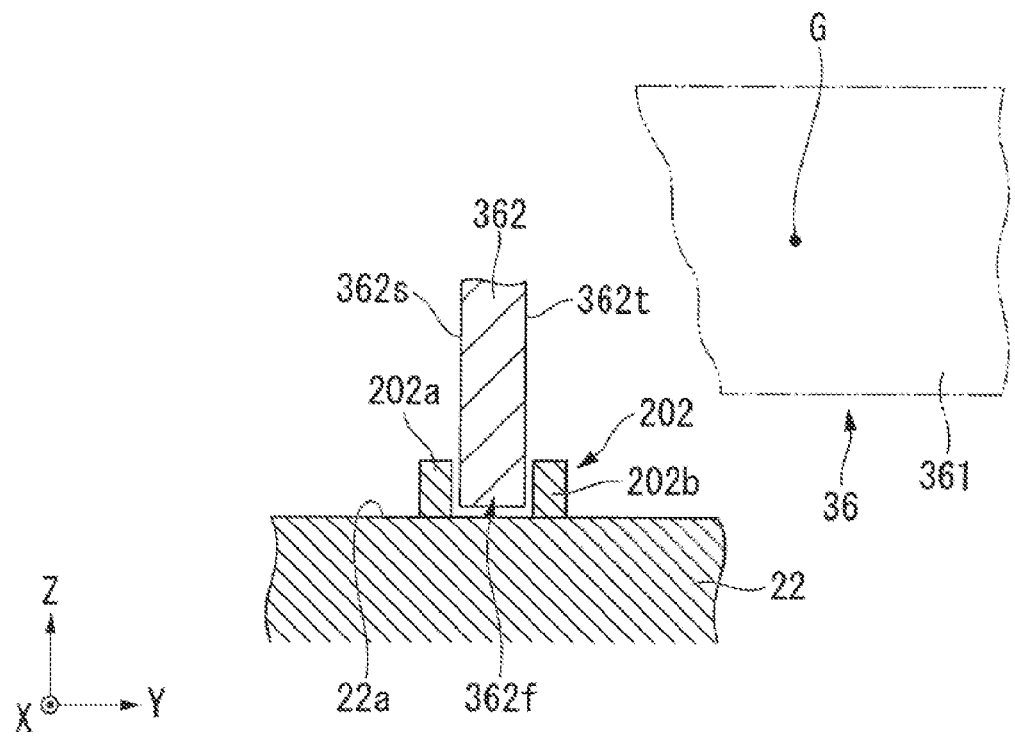
FIG. 6 is an enlarged view showing part of the structure shown in FIG. 5.

FIGS. 4 to 6 show a state in which the base 362 is attached. FIG. 4 is a perspective view of the base 362 viewed in the +Y direction. FIG. 5 is a cross-sectional view of a portion including one of the restricting portions 202 taken along a plane parallel to the YZ plane.

The two restricting portions 202 are so positioned that they sandwich a central portion 362g of the facing portion 362f in the X direction, as shown in FIG. 4. The two restricting portions 202 are so positioned that they are symmetric in the X direction with respect to the central portion 362g. The number of restricting portions 202 may be one or three or more in the X direction. When one restricting portion 202 is provided, it can be disposed, for example, at the central portion 362g.

The protrusions 202a and the protrusions 202b are so formed that they protrude from the bottom surface 22a of the lower case 22 in the +Z direction, as shown in FIGS. 4 and 5. The protrusions 202a and the protrusions 202b are so disposed that they sandwich the first plate surface 362s and the second plate surface 362t. Each of the protrusions 202a and the protrusions 202b has a U-like shape when viewed in the Z direction. Each of the protrusions 202a is so formed that it has two protruding portions extending in the +Y direction toward the first plate surface 362s of the base 362. Each of the protrusions 202b is so formed that it has two protruding portions extending in the −Y direction toward the second plate surface 362t of the base 362.

Further, the fixing portions 362d of the base 362, which are fixed to the columnar portions 201 of the lower case 22, and the restricting portions 202, which restrict movement of the base 362, are so positioned that the distance between the fixing portions 362d and the restricting portions 202 in the height direction (Z direction) is at least one-half the dimension of the base 362 in the height direction, as shown in FIG. 4. The configuration described above can more efficiently restrict movement of the base 362, which supports the projection lens section 36, in particular, rotation of the base 362 around the direction perpendicular to not only the height direction (gravitational direction) but also a direction perpendicular to the projection direction (X direction).

FIG. 6 is an enlarged view showing part of the structure shown in FIG. 5.

The facing portion 362f is disposed with a gap between the facing portion 362f and the bottom surface 22a of the lower case 22, as shown in FIG. 6. Further, the facing portion 362f is disposed with a gap between the facing portion 362f and each of the protrusions 202a and the protrusions 202b. The facing portion 362f and the protrusions 202a, 202b (that is, base 362 and restricting portions 202) are not in contact with each other.

The projection lens section 36, which includes the lens main body 361 and the base 362, has a center of gravity G. The protrusions 202a and the protrusions 202b are disposed along the direction of rotation of the facing portion 362f around a straight line passing through the center of gravity G and parallel to the X axis. The protrusions 202a and the protrusions 202b are therefore disposed in positions where they can come into contact with the facing portion 362f when the facing portion 362f moves in the direction of rotation thereof.

In FIG. 6, the protrusions 202a and the protrusions 202b are disposed along the rotational direction in which the facing portion 362f rotates around the X axis with the center of gravity G being the center of rotation as described above, but the protrusions 202a and the protrusions 202b are not necessarily configured this way. For example, the protrusions 202a and the protrusions 202b may be disposed along a rotational direction in which the facing portion 362f rotates around the Y axis or the Z axis with the center of gravity G being the center of rotation.

Figure 7:
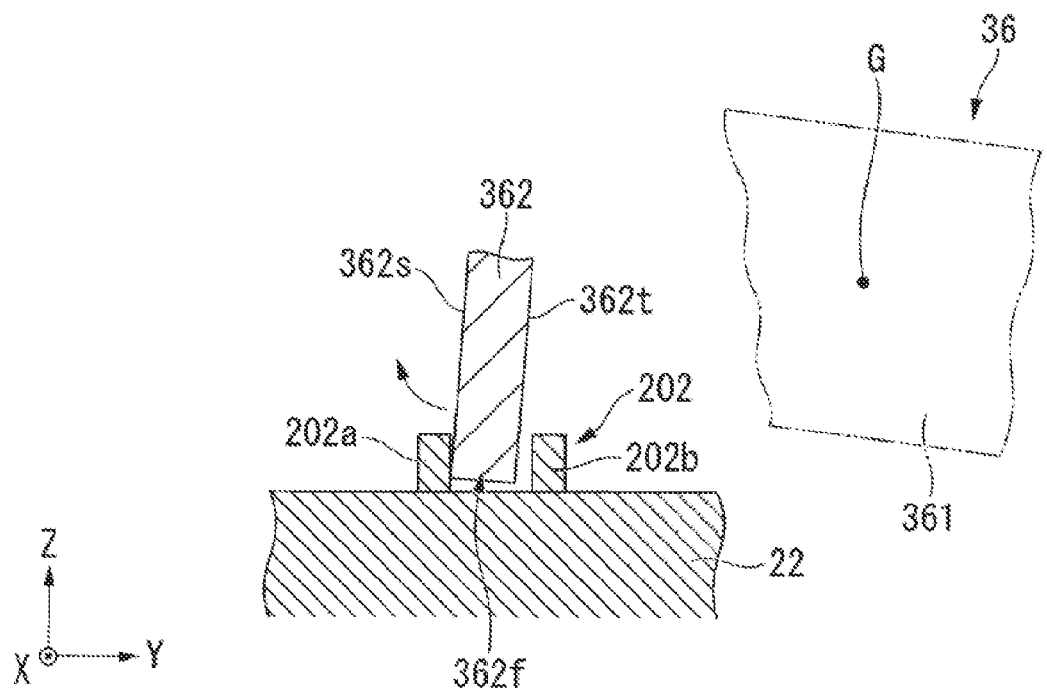
FIG. 7 shows that movement of the base is restricted.

In the projector 100 configured as described above, when the enclosure 2 accidentally falls or hits an object and an impact externally acts on the enclosure 2, for example, the impact causes the projection lens section 36 to oscillate in the rotational direction around the center of gravity G. The impact, for example, causes the base 362, which is disposed at the end of the projection lens section 36, to rotate around a straight line parallel to the X axis and passing through the center of gravity G, as shown in FIG. 7.

In view of the fact described above, since the protrusions 202a and 202b are so positioned that they sandwich the facing portion 362f of the base 362 in the Y direction, the rotation of the base 362 causes the facing portion 362f to come into contact, for example, with the protrusions 202a, and the movement of the base 362 in the rotational direction is restricted. Further, for example, since the direction of gravity acting on the projector 100 placed on a horizontal surface (what is called horizontal placement) and the direction of gravity acting on the projector 100 hung from a ceiling (what is called downward hanging) differ from each other, the directions of the moments produced at the time of impact in the above two cases differ from each other. An impact may therefore move the facing portion 362f toward the protrusions 202b depending on the attitude of the projector 100. In the present embodiment, since the protrusions 202a and 202b are so positioned that they sandwich the base 362, the protrusions 202a and 202b can restrict the movement of the base 362 in the rotational direction in both cases where the base 362 moves in the rotational direction toward the first plate surface 362s and in the rotational direction toward the second plate surface 362t.

As described above, since the projector 100 according to the present embodiment includes the restricting portions 202, which are so provided that they can come into contact with the base 362 and restrict movement of the base 362, movement of the base 362 is restricted even when an impact or any other force acts on the projection lens section 36. In this case, the amount of stress induced in the columnar portions 201, the fixing portions 362d, and other portions via which the base 362 is attached to the enclosure 2 can be reduced, whereby the base 362 or the enclosure 2 will not be broken. The thus provided projector 100 excels in impact resistance.

Further, according to the present embodiment, since the restricting portions 202 are so positioned that they are not in contact with the base 362, the base 362 will not be positioned by the restricting portions 202, whereby precision at which the projection lens section 36 is attached will not deteriorate.

Moreover, according to the present embodiment, since the restricting portions 202 are provided in the form of the protrusions 202a and 202b, which protrude from the lower case 22 (enclosure 2), movement of the base 362 can be restricted without use of screws or any other fixing member, whereby the number of parts can be reduced and the efficiency at which the projector 100 is assembled can be improved.

Further, according to the present embodiment, the configuration in which the protrusions 202a and 202b have protruding portions extending in the Y direction is strong enough against stress in the Y direction, whereby a force acting from the base 362 on the protrusions 202a and 202b in the Y direction can be more reliably received.

The technical range of the invention is not limited to the embodiment described above, and changes can be made thereto as appropriate to the extent that the changes do not depart from the substance of the invention.

For example, the above embodiment has been described with reference to the configuration in which the restricting portions 202 are so positioned that they sandwich the base 362 in the Y direction, but the configuration described above is not necessarily employed.

Figure 8:
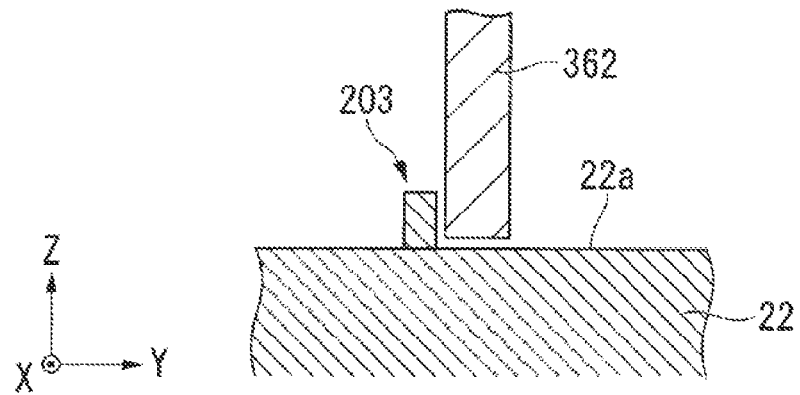
FIG. 8 is a cross-sectional view showing the configuration of a restricting portion according to a variation.

FIG. 8 is a cross-sectional view showing the configuration of a restricting portion according to a variation.

A restricting portion 203 may be provided only on one side of the base 362 in the Y direction, as shown in FIG. 8. FIG. 8 shows a configuration in which the restricting portion 203 is disposed only on the −Y side of the base 362, but the configuration shown in FIG. 8 is not necessarily employed and the restricting portion 203 may alternatively be disposed only on the +Y side of the base 362. The configurations described above can also restrict movement of the base 362.

Further, the above embodiment has been described with reference to the configuration in which the restricting portions 202 are provided in the lower case 22, but the configuration is not necessarily employed.

Figure 9:
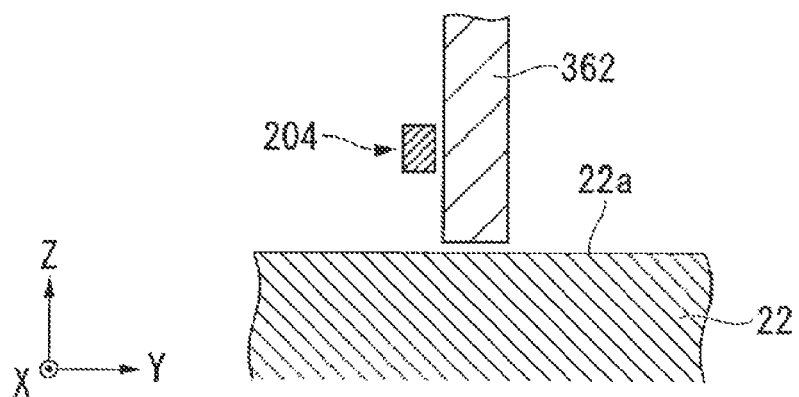
FIG. 9 is a cross-sectional view showing the configuration of a restricting portion according to another variation.

FIG. 9 is a cross-sectional view showing the configuration of a restricting portion according to another variation.

A restricting portion 204 may be provided in a position independent of the lower case 22, as shown in FIG. 9. In this case, the restricting portion 204 may be disposed in the upper case (not shown) or may be disposed at any other location. The configurations described above can also restrict movement of the base 362.

Figure 10:
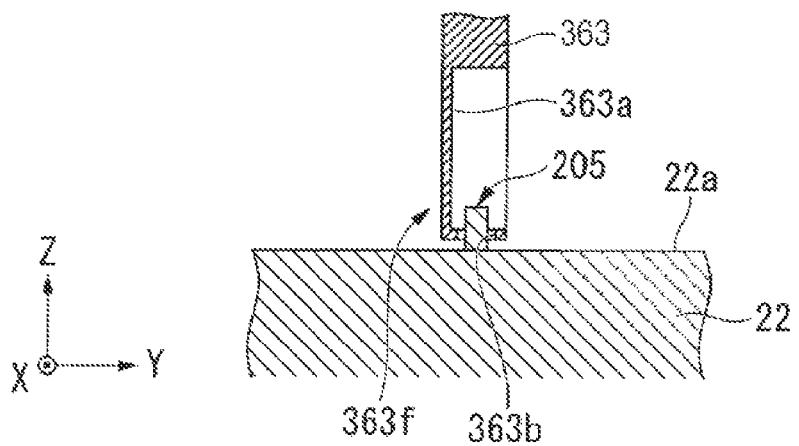
FIG. 10 is a cross-sectional view showing the configuration of a restricting portion according to another variation.
Figure 11:
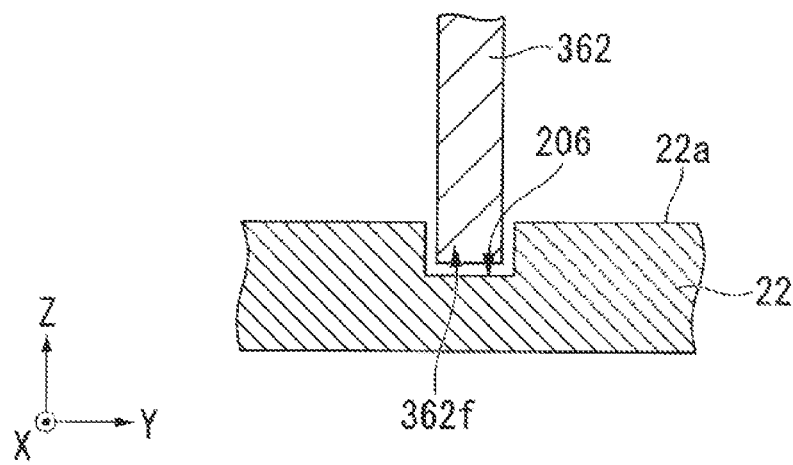
FIG. 11 is a cross-sectional view showing the configuration of a restricting portion according to another variation.
Figure 12:
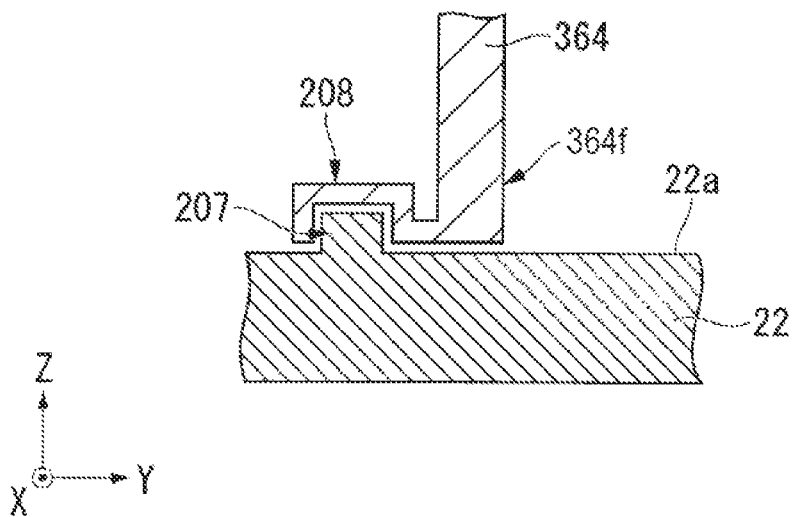
FIG. 12 is a cross-sectional view showing the configuration of a restricting portion according to another variation.

FIGS. 10 to 12 are cross-sectional views showing the configurations of restricting portions according to other variations.

The configuration of the embodiment described above may, for example, be replaced with the following components: a recessed portion (or hollow portion) 363a provided in a base 363; a communication hole 363b, which is provided in a facing portion 363f and communicates with the recessed portion 363a; and a columnar restricting portion 205, which is provided in the lower case 22 and passes through the communication hole 363b, as shown in FIG. 10. The configuration described above can also restrict movement of the base 363.

Further, for example, a recessed portion 206a may be provided in the lower case 22, and the facing portion 362f of the base 362 may be accommodated in the recessed portion 206a, as shown in FIG. 11. In this case, the recessed portion 206a may be so designed that the wall thereof is located along the direction in which the facing portion 362f moves. The configuration described above can also restrict movement of the base 362.

Further, for example, a protrusion 207 may be provided in the lower case 22, and a protrusion 208 corresponding to the protrusion 207 may be provided on a facing portion 364f of a base 364, as shown in FIG. 12. In this case, the shapes and positions of the protrusion 208 and the protrusion 207 may be so set that the protrusion 208 comes into contact with the protrusion 207 when the facing portion 364*f* moves. The configuration described above can also restrict movement of the base 364.

Further the above embodiment has been described with reference to the configuration in which the facing portion 362*f* of the base 362 is not in contact with the restricting portions 202, but the configuration described above is not necessarily employed. For example, the facing portion 362*f* may be positioned by the restricting portions 202.

What is claimed is:

1. A projector comprising:
    a light source section that outputs light;
    a light modulator that modulates the light outputted from the light source section based on image information;
    a projection lens that projects the modulated light;
    an enclosure that accommodates the light source section, the light modulator, and the projection lens;
    a base that supports the projection lens and fixes the projection lens to the enclosure;
    a restricting portion that restricts movement of the base; and
    columnar portions provided on an inner surface of the enclosure,
    wherein
        the base includes fixing portions provided on both end sides of the base,
        the fixing portions are fixed to the columnar portions with fixing members,
        the restricting portion is disposed on the inner surface of the enclosure, and
        the columnar portions and the restricting portion are disposed on a same plane of the inner surface of the enclosure.

2. The projector according to claim 1,
    wherein the restricting portion is disposed in a position where the restricting portion restricts rotation of the projection lens and the base around the center of gravity of the projection lens.

3. The projector according to claim 1, wherein
    the restricting portion is disposed in a position where the restricting portion is not in contact with the base when the base is disposed in a first position, and
    the restricting portion contacts the base to restrict motion of the base when the base is moved to a second position different from the first position.

4. The projector according to claim 1,
    wherein the restricting portion is disposed in the enclosure.

5. The projector according to claim 1,
    wherein the base has a plate-like shape and has a first plate surface and a second plate surface facing away from the first plate surface, and
    the restricting portion is disposed in positions that sandwich the first plate surface and the second plate surface of the base.

6. The projector according to claim 1,
    wherein the base is elongated in a predetermined direction,
    the restricting portion is provided in a plurality of positions, and
    the plurality of restricting portions are disposed along the predetermined direction.

7. The projector according to claim 1, wherein
    the base has a fixing portion that fixes the base to the enclosure, and
    the fixing portion and the restricting portion are so positioned that the distance between the fixing portion and the restricting portion in a height direction, which extends between a first edge of the base adjacent to the restricting portion and a second edge of the base opposite to the first edge, is at least one-half the dimension of the base in the height direction.

\* \* \* \* \*